H. C. CLAY.
CENTRIFUGAL GOVERNOR.
APPLICATION FILED JUNE 20, 1908.

904,602.

Patented Nov. 24, 1908.

2 SHEETS—SHEET 1.

Witnesses
Frank A. Fahle
Thomas W. McMeans

Inventor
Harry C. Clay,
BY
Bradford Hood
Attorneys

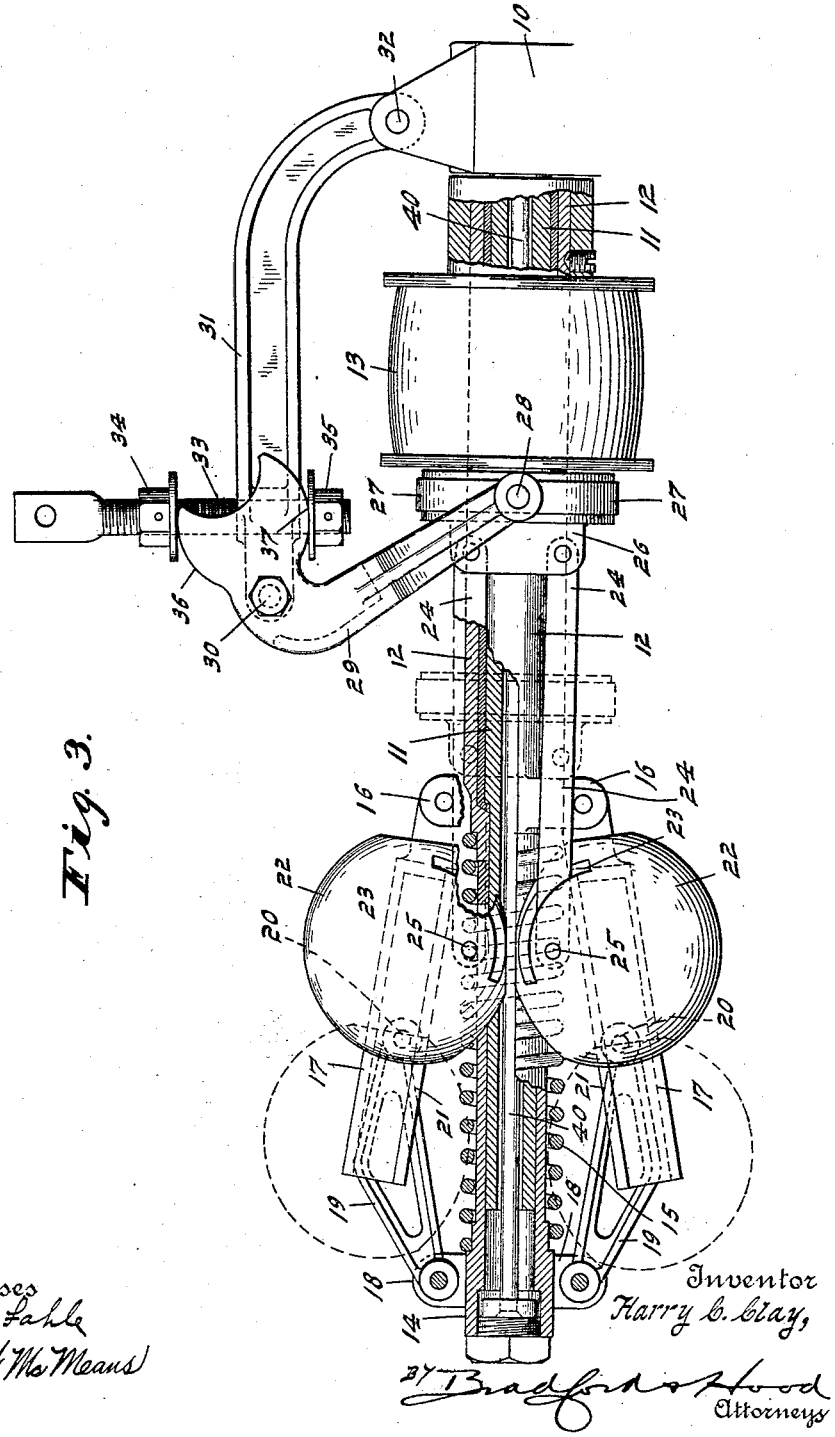

UNITED STATES PATENT OFFICE.

HARRY C. CLAY, OF COLUMBUS, INDIANA, ASSIGNOR TO REEVES & COMPANY, OF COLUMBUS, INDIANA, A CORPORATION OF INDIANA.

CENTRIFUGAL GOVERNOR.

No. 904,602.     Specification of Letters Patent.     Patented Nov. 24, 1908.

Application filed June 20, 1908. Serial No. 439,526.

*To all whom it may concern:*

Be it known that I, HARRY C. CLAY, a citizen of the United States, residing at Columbus, in the county of Bartholomew and State of Indiana, have invented certain new and useful Improvements in Centrifugal Governors, of which the following is a specification.

The object of my invention is to produce a centrifugal governor, conveniently but not necessarily of the throttle valve type, wherein the governing speed may be readily changed by shifting the centrifugal elements, during motion if desired, the construction being also such that the working position of the throttle valve, or other part controlled by the governor, will remain undisturbed by adjustment of the centrifugal elements.

The accompanying drawings illustrate my invention.

Figure 1:
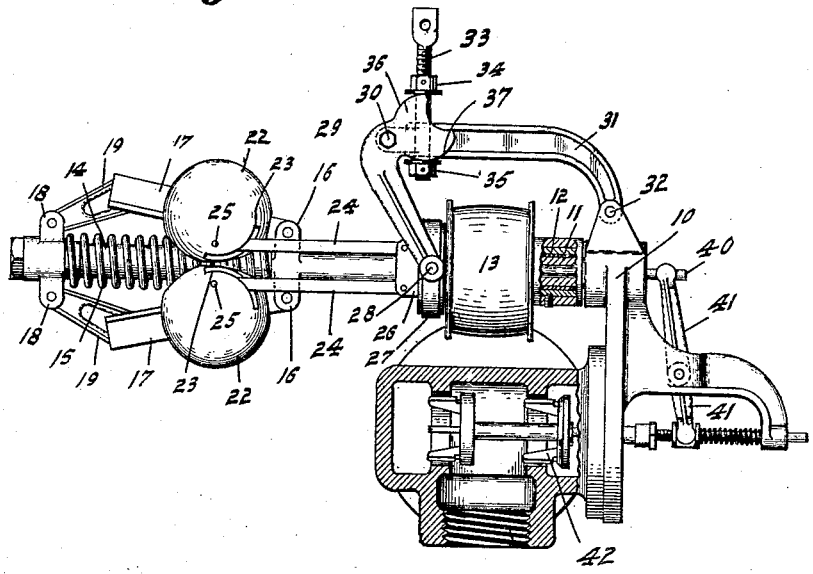
Figure 2:
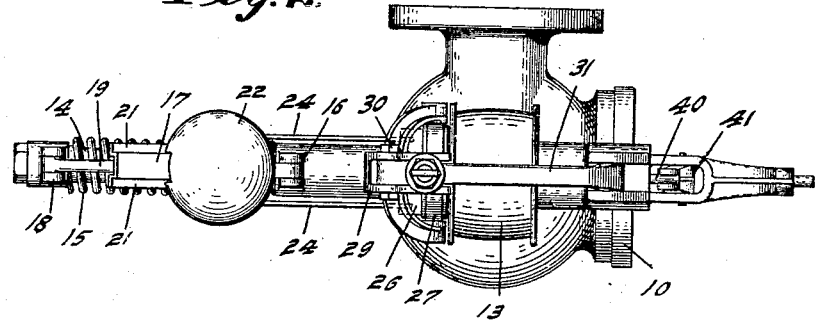

Figure 1 is a side elevation of a complete throttle-valve governor equipped with my improved structure, the valve body and a portion of the stem being shown in section; Fig. 2 a plan of the parts shown in Fig. 1; Fig. 3 a partial axial section of the governor proper on a scale larger than that of Figs. 1 and 2.

In the drawings, 10 indicates a suitable supporting bracket having a hollow stem 11 upon which is journaled a sleeve 12 carrying a pulley 13. Also journaled upon stem 11 and axially movable thereon, is a sleeve 14 which is normally urged away from sleeve 12 by a compression spring 15. Sleeve 12 carries oppositely projecting ears 16, 16 to each of which is pivoted a toggle arm 17, these arms lying parallel with the axis of sleeves 12 and 14. Sleeve 14 is similarly provided with a pair of oppositely extending ears 18, 18 to each of which is pivotally connected one end of a toggle arm 19 the opposite end of which is pivotally connected at 20 to the coöperating toggle arm 17. Thus far the construction is substantially a common one. For my purposes I prefer to so form the arm 17 that the arm 19 may be partially nested therein, as clearly shown in the drawings, so as to thus increase the effective length of arms 17 so far as the centrifugal elements are concerned, each of these arms being provided with oppositely extending wings or flanges 21 upon which the centrifugal element or ball 22 is slidably mounted. Balls 22 are partially hollow and slots 23 are formed through the shells so as to permit the passage of the ends of links 24, two links 24 being provided for each ball and the links being pivoted to the balls upon pins 25 which are substantially parallel with the pivots of the arms 17. The rear ends of links 24 are pivotally connected to a collar 26 slidably mounted upon sleeve 12. Rotatably mounted in a suitable circumferential groove in collar 26 is a yoke ring 27 connected by pins 28 with a shifting yoke 29. Yoke 29 is pivoted at 30 to an arm 31 pivoted at 32 to bracket 10. Threaded through arm 31 is an operating rod 33 provided with a pair of collars 34—35 which engage the arc shaped edges 36 and 37 respectively of the short arm of yoke 29, the arrangement being such that, by turning rod 33 so as to drive it in one direction or the other through arm 31, the yoke 29 may be caused to swing so as to shift collar 26 upon sleeve 12 and thus shift the centrifugal elements 22 along arms 17 and thus vary their centrifugal effect upon the mechanism. Of course any other suitable form of shifting mechanism may be provided for shifting the balls on arms 17.

Axially movable through stem 11 is a pin 40 which, at one end, is in engagement with the stem 14 and at the other end is in engagement with the member which is to be moved in accordance with the speed of rotation of the governor. In the drawings I have shown this mechanism as a lever 41, and a throttle valve 42.

In operation the collar 26 may be shifted from the position shown in full lines in Fig. 3, toward and to the position indicated by dotted lines, while the governor mechanism is being rotated by an application of power to pulley 13 and, as the balls 22 are made to approach the position indicated in dotted lines in Fig. 3 the centrifugal effect of the balls 22 will be increased and spring 15 compressed at lower and lower speeds.

I claim as my invention:—

1. The combination, in a speed controlled governor, of a pair of rotatable members axially movable toward and from each other, a yielding connection between said members urging the same in one direction, a toggle connecting said members with one arm of the toggle extending beyond the knuckle, a governor ball mounted upon said arm of the toggle and movable along the same across the knuckle, and means for shifting said governor ball along said arm during its revolution.

2. The combination, in a speed controlled governor, of a pair of rotatable members axially movable toward and from each other, connecting mechanism between said members to control the axial movement thereof, a centrifugal element carried by said connection and movable relatively thereto to vary its centrifugal effect, a rotatable shifting element connected with said centrifugal element, a yoke lever adapted to engage said shifting element, a link pivoted upon a suitable support and pivotally supporting said yoke lever, a shifting rod threaded through said link, and means carried by said shifting rod for engaging the yoke lever and swinging the same in either direction upon its pivot by rotation of the shifting rod.

In witness whereof, I have hereunto set my hand and seal at Columbus, Indiana, this fifth day of June, A. D. one thousand nine hundred and eight.

HARRY C. CLAY. [L. S.]

Witnesses:
   PERRY KING,
   LA FAYETTE BRUCE.